June 9, 1942.  H. DREYFUS  2,285,502

MANUFACTURE OF TUBES AND OTHER HOLLOW ARTICLES

Filed Oct. 28, 1938

Gelatine  Cellulose Acetate

H. DREYFUS
INVENTOR

ATTORNEYS

Patented June 9, 1942

2,285,502

UNITED STATES PATENT OFFICE 2,285,502

MANUFACTURE OF TUBES AND OTHER HOLLOW ARTICLES

Henry Dreyfus, London, England, assignor to Celanese Corporation of America, a corporation of Delaware Application October 28, 1938, Serial No. 237,470 In Great Britain November 4, 1937

11 Claims. (Cl. 18—58)

This invention relates to improvements in the manufacture of tubes and other hollow articles, in particular from film-forming solutions.

According to the present invention hollow articles are made by a process which comprises depositing on a former having porous or perforated walls a base layer of a solid material soluble in a solvent which will have little or no effect on the hollow article produced, forming the hollow article upon said base layer from a film-forming solution and then applying such a solvent to the base layer through the walls of the former so as to facilitate removal of the hollow article therefrom.

The solid material forming the base layer on the former is, as previously indicated, a substance which can be dissolved by a solvent which does not dissolve the material of which the tube or other hollow article is made. Gelatine and water-soluble cellulose ethers are of general application in this connection. The former should be hollow as well as perforated or porous in nature, so that the solution employed can reach the base layer easily and quickly. It should be noted that in some cases, for instance where the first stage of solution of the substance of the base layer consists of absorption of solvent accompanied by gelatinisation, as when the base layer is gelatine and the solvent is water, it is not necessary to effect complete solution of the base layer in order that the hollow article may be removed easily from the former.

In putting the invention into practice to produce a tube closed at one end, a hollow former of the same configuration of slightly smaller dimensions may be dipped into a bath of the composition from which the base layer is to be formed, e. g., an aqueous solution of gelatine or of methyl cellulose, the film thus produced allowed to dry and the coated former then dipped into a solution of a film-forming substance in a volatile solvent and dried; the dipping operations may, of course, be repeated if necessary to produce layers of the desired thickness. The base layer may then be gelatinised or completely dissolved by filling the hollow former with water, or by flowing a current of water through the former by means of a pipe reaching to the bottom thereof so that the tube may easily be removed.

The invention is of particular importance in connection with the manufacture of tubes and other hollow articles from solutions of cellulose derivatives, e. g., from cellulose acetate or other cellulose ester or benzyl cellulose or other water-insoluble cellulose ether, in volatile solvents since such solutions lend themselves very well to the production of sheets and films by dipping or spraying. The invention may, however, be applied to the manufacture of hollow articles from other compositions, for instance from compositions having a basis of artificial resins and organic condensation and polymerisation products. The invention may also be applied to the production of hollow articles from natural and artificial rubber compositions and in this connection it is to be noted that the manufacture of bottles is an important embodiment of the invention where the formed hollow article is elastic in nature; the neck of the bottle may be expanded over the wider part of the former when being removed therefrom.

By way of example the process according to the invention will now be described in greater detail with reference to the accompanying diagrammatic drawing in which Fig. 1 is a sectional elevation showing the construction of the former;

Figure 1:
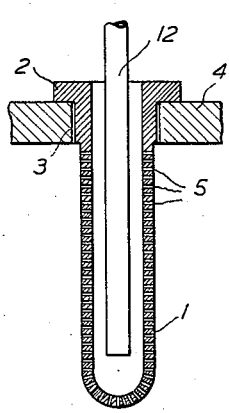
Figure 2:
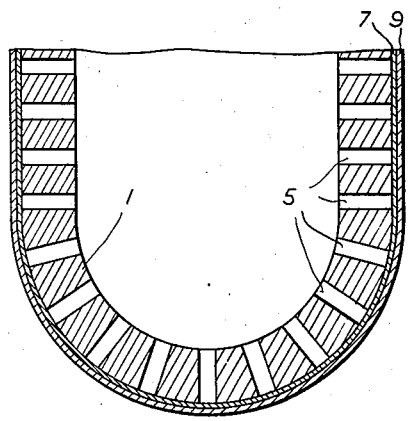
Fig. 2 is a sectional elevation of part of the former shown in Fig. 1 drawn to an enlarged scale and showing the hollow article and base layer in position on the former.
Figure 3:
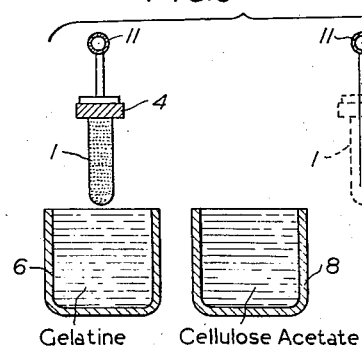
Fig. 3 is a view showing the manner of using the former.

Referring to Figs. 1-3, the former 1 is of tubular construction closed at one end and is provided with a flange 2 and a shoulder 3 by which it is secured to a support 4. The surface of the former 1 below the shoulder 3 is provided with a plurality of small perforations 5 communicating with the hollow interior of the former.

The formation of hollow articles upon the former 1 proceeds as follows:

The support 4 with the former 1 is first lowered to allow the perforated portion of the former 1 to dip into a bath 6 containing an aqueous solution of gelatine. The support 4 is then raised and the base layer 7 of gelatine thus produced on the former 1 allowed to dry, after which the support 4 is transferred to a second bath 8, containing a solution of cellulose acetate in a volatile solvent, into which the gelatine coated former is dipped. The support 4 is again raised to withdraw the former 1 from the bath 8, the base layer 7 on the former now being covered with a film 9 of the cellulose acetate solution. After the film 9 is dry the support 4 with the former 1 is transferred to a water supply pipe 11 having an outlet pipe 12 which is passed into the interior of the former. A current of water from the outlet pipe 12 is then passed into the hollow former 1, the water percolating through the perforations 5 into contact with the soluble gelatine base layer 7. After the base layer 7 has become gelatinized or completely dissolved by the water, the hollow article consisting of the film of cellulose acetate 9 is readily removed from the former 1.

Figure 4:
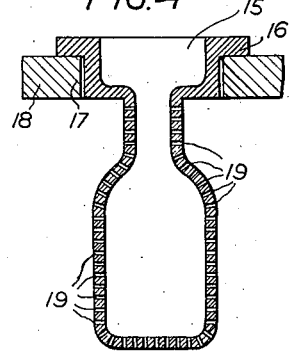
Fig. 4 is a sectional elevation of a modified form of former.

When it is desired to form bottles from natural or artificial rubber compositions, a suitably shaped former 15 is employed (see Fig. 4). The former 15 is provided with a flange 16 and a shoulder 17 for securing the former 15 to a support 18. The portion of the former below the shoulder 17 is bottle shaped and provided with a plurality of perforations 19 communicating with the hollow interior of the former. The rubber bottles are formed by dipping operations similar to those described above and upon withdrawal of the completed bottle from the former, the neck portion of the bottle is expanded over the wider part of the former.

Having described my invention, what I desire to secure by Letters Patent is:

1. Process for the production of hollow articles, which comprises depositing on a former having porous walls a base layer of a solid material soluble in a solvent which will have little or no effect on the hollow article produced, forming the hollow article upon said base layer from a film-forming solution and then applying such a solvent to the base layer through the walls of the former so as to facilitate removal of the hollow article therefrom.

2. Process for the production of hollow articles, which comprises depositing on a former having porous walls a base layer comprising gelatine, forming the hollow article upon said base layer from a film forming solution and then applying water to said base layer through the walls of the former so as to facilitate removal of the hollow article therefrom.

3. Process for the production of hollow articles, which comprises depositing on a former having porous walls a base layer comprising a water-soluble ether, forming the hollow article upon said base layer from a film forming solution and then applying water to said base layer through the walls of the former so as to facilitate removal of the hollow article therefrom.

4. Process for the production of hollow articles, which comprises depositing on a former having porous walls by a dipping operation a base layer of a solid material soluble in a solvent which will have little or no effect on the hollow article produced, forming the hollow article upon said base layer from a film forming solution by a further dipping operation, and then applying such a solvent to the base layer through the walls of the former so as to facilitate removal of the hollow article therefrom.

5. Process for the production of hollow articles which comprises depositing on a former having porous walls by a dipping operation a base layer comprising gelatine, forming the hollow article upon said base layer from a film forming solution by a further dipping operation, and then applying water to the base layer through the walls of the former so as to facilitate removal of the hollow article therefrom.

6. Process for the production of hollow articles which comprises depositing on a former having porous walls by a dipping operation a base layer comprising a water-soluble ether, forming the hollow article upon said base layer from a film forming solution by a further dipping operation, and then applying water to the base layer through the walls of the former so as to facilitate removal of the hollow article therefrom.

7. Process for the production of hollow articles which comprises depositing on a former having porous walls a base layer of solid material soluble in a solvent which will have little or no effect on the hollow article produced, forming the hollow article upon said base layer from a film forming solution having a basis of cellulose acetate, and then applying such a solvent to the base layer through the walls of the former so as to facilitate removal of the hollow article therefrom.

8. Process for the production of hollow articles which comprises depositing on a former having porous walls a base layer comprising gelatine, forming the hollow article upon said base layer from a film forming solution having a basis of cellulose acetate, and then applying water to the base layer through the walls of the former so as to facilitate removal of the hollow article therefrom.

9. Process for the production of hollow articles which comprises depositing on a former having porous walls a base layer comprising a water-soluble ether, forming the hollow article upon said base layer from a film forming solution having a basis of cellulose acetate, and then applying water to the base layer through the walls of the former so as to facilitate removal of the hollow article therefrom.

10. Process for the production of hollow articles which comprises depositing on a former having porous walls by a dipping operation a base layer comprising gelatine, forming the hollow article upon said base layer from a film forming solution having a basis of cellulose acetate by a further dipping operation, and then applying water to said base layer through the walls of the former so as to facilitate removal of the hollow article therefrom.

11. Process for the production of hollow articles which comprises depositing on a former having porous walls by a dipping operation a base layer comprising a water-soluble ether, forming the hollow article upon said base layer from a film forming solution having a basis of cellulose acetate by a further dipping operation, and then applying water to said base layer through the walls of the former so as to facilitate removal of the hollow article therefrom.

HENRY DREYFUS.